United States Patent

[11] 3,628,658

[72] Inventor James F. Cotter
Lancaster, Ohio
[21] Appl. No. 12,235
[22] Filed Feb. 18, 1970
[45] Patented Dec. 21, 1971
[73] Assignee Anchor Hooking Corporation
Lancaster, Ohio

[54] ASSORTING DEVICE
26 Claims, 8 Drawing Figs.

[52] U.S. Cl. .................................................. 209/125,
209/100, 209/74, 198/229
[51] Int. Cl. ......................................................... B07c 5/06
[50] Field of Search ......................................... 209/72, 71,
74, 97, 100, 103, 125; 198/229

[56] References Cited
UNITED STATES PATENTS
1,555,116  9/1925  Harber .......................... 198/229 X
2,948,394  8/1960  Frank et al. .................... 209/97

Primary Examiner—Allen N. Knowles
Attorney—Wood, Herron & Evans

ABSTRACT: An assorting device having a vibratory live plate or table for disposition between a feed conveyor and a takeoff conveyor for moving articles from the feed to the takeoff conveyor under normal operating conditions, and for segregating certain types of abnormal articles to prevent them from being passed to the takeoff conveyor. The device is especially suitable for use in the manufacture of glassware and especially glass containers such as bottles. The table is characterized in that it comprises a trap door preferably associated with a single column of ware carried by the feed conveyor, the trap door being restrainable in the open attitude to permit an entire column of pieces (in the case of glassware, including malformed ware and/or cullet) to be discharged or assorted at the end of the feed conveyor into a discard bin or a collection conveyor without affecting the conveyance of the other columns or pieces across the table onto the takeoff conveyor; such a feature permits the elimination of an entire column of pieces as desired when a common defect exists among such pieces. Further, each trap door is characterized in that it comprises a reciprocating jaw plate at the leading or upstream edge of the trap door, the jaw plate being yieldably retractable downward at an acute angle from the feed conveyor as required to prevent cullet or chips which are trapped or lodged in the feed conveyor from jamming rigidly against the leading edge of the jaw plate; such feature prevents the leading edge of the table from being unduly nicked or deformed or disfigured to the point that the transfer of pieces across the table is adversely affected.

INVENTOR.
James F. Cotter
BY
Wood, Herron & Evans
ATTORNEYS

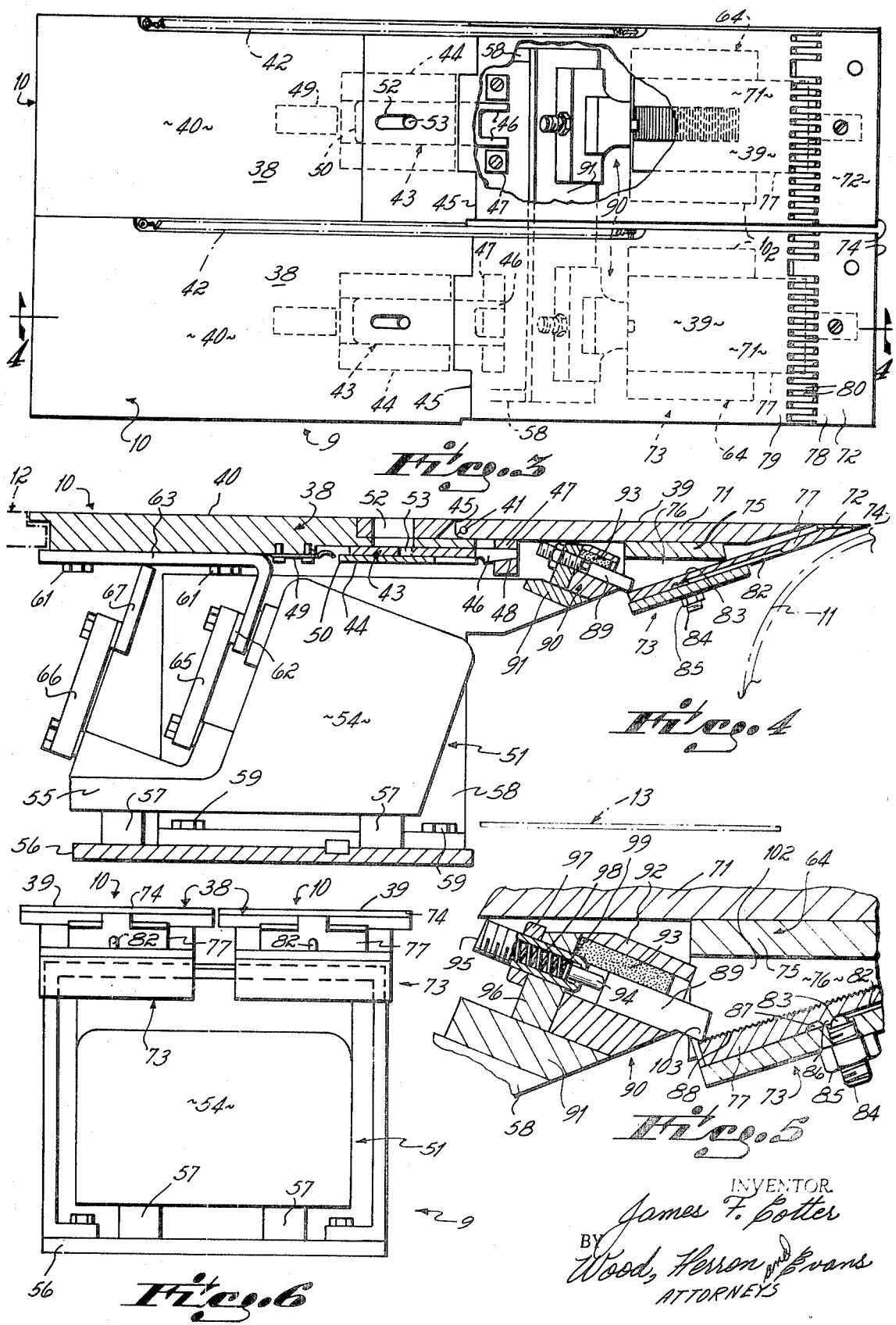

INVENTOR.
James F. Cotter
BY
Wood, Herron and Evans
ATTORNEYS

ASSORTING DEVICE

This invention relates to an assorting device for separating or segregating solid pieces into groups. More particularly this invention relates to an assorting device which permits automatic discharge of selected pieces from a feed or basic group of pieces at the point of transfer of that group of pieces from a first conveyor to a second conveyor.

The invention can be further explained most readily with detailed reference to a typical application, as in connection with the transfer of newly formed glassware from a lehr belt onto a takeoff conveyor or liner. In the glass industry, ware, for example bottles, after forming to desired shape, is transferred onto a lehr belt for annealing. Commonly the lehr belt is quite wide and receives the ware in rows of ten, twelve, or more bottles. The bottles may be arranged in rows on the belt, as by a push bar stacker. A row of bottles, for the purposes of this application, is considered to be a single line of bottles generally positioned in the cross machine direction, i.e., transverse to the motion axis of the lehr belt. The bottles are generally positioned quite closely together on the lehr belt, for example, commonly between about ⅜inch and about 1 ½inch from bottle to bottle, so as to approach a high-density loading. The loading of the lehr belt conveyor also provides columns of bottles, in addition to rows of bottles. A column of bottles, for the purposes of this application, is considered to be a single line of bottles generally positioned in the machine direction, i.e., parallel to the motion axis of the lehr belt. As is well known, the lehr belt carries the newly formed ware into and through an oven wherein forming stresses are reduced by annealing.

The lehr belt, at its downstream end, communicates with a takeoff conveyor which usually runs transverse to the machine direction of the lehr belt conveyor. The takeoff conveyor may be an unscrambler-type conveyor, an accumulating table-type conveyor, or other kind of conveyor known to the art, the main function of the takeoff conveyor usually being to reposition the ware from its geometrical configuration on the lehr, e.g., a series of rows and columns, into one or more lines or files on the takeoff conveyor.

The lehr belt is commonly separated from the takeoff conveyor by a transfer plate, the ware passing from the lehr belt when the latter passes over its end roll, onto and over the transfer plate, and then onto the takeoff conveyor. Years ago the transfer plate was simply a dead plate and the ware was shoved from the lehr belt across the dead plate and onto the takeoff conveyor by mass force feed, i.e., the bottles still on the lehr belt would push bottles ahead of them across the dead plate onto the takeoff conveyor. However, in recent times a vibrating live plate has been developed which provides an automatic, steady flow of rows and columns of ware from the lehr belt to the takeoff conveyor. The vibrating live plate provides a directional vibratory conveying movement which reduces the objectional bottle-to-bottle abrasion of force feed. Generally, the vibrating live plate is provided with variable control of power, enabling the operator to match or exceed the feed rate of the lehr belt as desired. However, a single live plate extending the width of the lehr belt must be provided with a plurality of vibratory drives or motors and each drive must be provided with its own control to achieve uniformity or synchronism of the vibratory motion imparted to the live plate across the entire width of the live plate.

The vibratory live plate as used today to aid in the transfer of ware from a lehr belt to a takeoff conveyor creates certain problems under certain operating conditions. The live plate of the prior art is commonly provided with a leading feather edge which tangentially closely approaches the conveying plane of the lehr belt where the lehr passes over its end roll, so that ware travelling on the lehr belt is more easily transferred from the conveying plane of the lehr belt to the conveying plane or top surface of the live plate. Such a device works well when there are no broken chips, fragmentary or malformed or otherwise undesirable pieces on the lehr belt, that is, when all pieces are whole and possess the desired characteristics. However, oftentimes a column of ware on the lehr belt will include fragmentary pieces, chips, slivers, or shards of glass which may be embedded in the chain mesh of the lehr belt. In other cases, the column of ware may include a fragmented pile of broken pieces, or it simply may have a objectionable percentage of malformed ware that possesses one undesirable characteristic or another. In the case of fragmentary pieces, such usually are generated upon mold release or by the breakage of ware within the annealing oven as the ware passes therethrough; such breakage may be caused by excessive unrelieved internal stresses in the glass. Such defects may cause the bottle to disintegrate into a pile of glass fragments of very irregular shapes and sizes, some of which may become embedded in the chain mesh link belt. In the case of malformed ware, once in a while the glass-forming machines will produce ware that is outside a predetermined specification range and, even though the ware is not broken, it may nonetheless have to be completely rejected until the specification problem is solved. It has been desirable to provide structure for automatically eliminating or separating all pieces in one column of ware from a series of columns of ware as the ware is transferred by a vibratory live plate from a lehr belt to a takeoff conveyor.

Fragmentary pieces are occasionally embedded or tightly held in the conveyor belt itself especially where the belt is of the chain or link type. These embedded fragmentary pieces, as they approach the leading or feather edge of the vibratory live plate, tend to follow the lehr belt as it passes over its end roll closely beneath the live plate. This causes the feather leading edge of the live plate to be chewed up or seriously deformed, indeed, to the extent that it eventually is a very rough edge rather than a feather edge. Bottles sliding onto such a disfigured edge tend to catch on or trip over the rough edge and, thereby, fall over. Such bottles must, of course, be removed at some point downstream by an operator, or some subsequent processing apparatus. So serious does this condition become that a seriously deformed edge can knock over every single bottle which engages it. Another disadvantage of a chewed up or rough leading edge is that pieces firmly embedded in the lehr belt tend to break again as they catch between the leading edge of live plate and the lehr belt. Oftentimes, upon breaking, the subfragments so formed jump into the air and, thus, provide the possibility of glass slivers landing inside an adjacent bottle. Of course, such fragmentary glass pieces or slivers within bottles cannot be tolerated especially where edible food will be placed in the bottles. Thus, such fragmentary pieces that are embedded in the lehr belt tend to ruin the feather edge of the live plate, as well as to provide potential problems in causing slivers to fly into adjacent jars or bottles, when the vibratory live plate structure of the prior art is employed.

If the fragmentary pieces simply reside on top of the lehr belt and are not embedded or enmeshed therein, as the belt proceeds beneath the feather edge of the live plate the pieces are simply transferred onto the live plate and proceed onto the takeoff conveyor where they are swept therefrom either by an operator or by additional ware proceeding onto the takeoff conveyor. This is a normal circumstance in the processing of ware at this point in their manufacture.

Thus, it has been one objective of this invention to provide an assorting device in the form of a transfer table or plate positioned between a first conveyor and a second conveyor, the table including a series of trap doors at least equal in number to the number of columns of pieces being carried by the first conveyor so that all pieces in one column on the first conveyor may be assorted out of proximity with all other pieces being carried on the first conveyor as those pieces are transferred to the second conveyor with the assorted pieces being automatically discharged from the assorting device.

It has been another objective of this invention to provide an assorting device in the form of a transfer table or plate positioned between a first conveyor and a second conveyor, the table including a jaw plate adjacent the first conveyor that is capable of yieldably retracting downward at an acute angle from the first conveyor required to permit debris or fragmentary pieces catching between the leading edge of the jaw plate and the first conveyor to pass beneath the jaw plate and be automatically discharged.

Other objectives and advantages will be more apparent from the following detailed description taken in conjunction with the drawings in which:

FIG. 3 is a top view, partially broken away, of a modular unit incorporating two assorting devices of this invention;

FIG. 4 is a cross-sectional view taken along lines 4—4 of FIG. 3;

FIG. 5 is a greatly enlarged cross-sectional view of the resilient means and positioning means associated with the assorting device;

FIG. 6 is a front view of the modular unit illustrated in FIG. 3;

Figure 1:
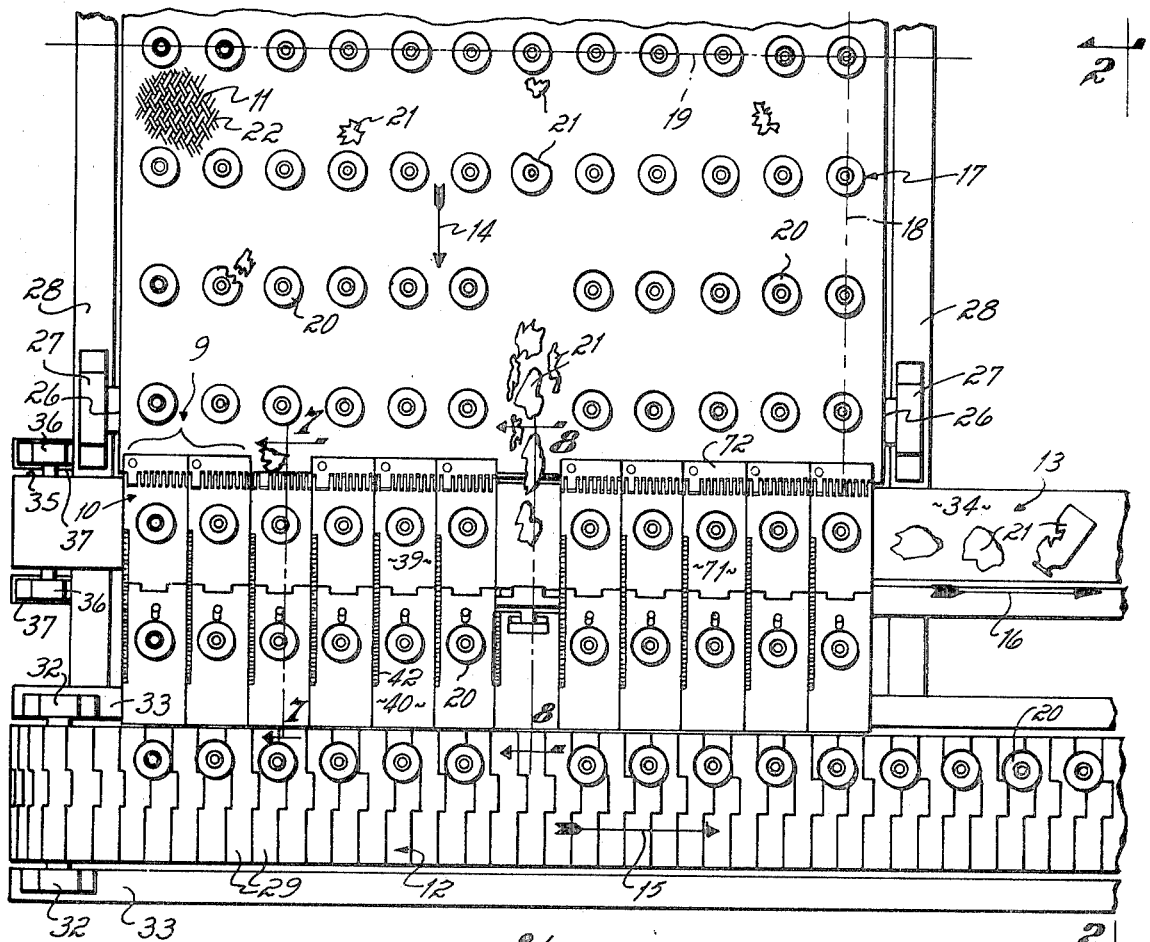
FIG. 1 is a top view of a series of assorting devices of this invention in combination with a lehr belt, a takeoff conveyor, a cullet conveyor.

As illustrated in FIG. 1, a series of modular units 9 having a pair of assorting devices 10 of this invention is shown in combination with (a) a first conveyor in the form of a lehr belt 11, (b) a second conveyor in the form of a takeoff conveyor 12, and (c) a third conveyor in the form of a cullet conveyor 13. The machine direction of the lehr belt 11 is illustrated by arrow 14, the machine direction of the takeoff conveyor is illustrated by arrow 15, and the machine direction of the cullet conveyor 13 is illustrated by arrow 16. The cross machine direction of each of these conveyors 11—13 is considered to be that direction transverse to the machine direction of the respective conveyor.

It will be noted from FIG. 1 that the glassware 17 on the lehr belt 11 is arranged in columns 18 and rows 19, the rows being presented in the cross machine direction of the lehr belt and the columns being presented in the machine direction of the lehr belt. Each column 18 and each row 19 of ware may include, at any one time, whole pieces (bottles 20 as shown in the figures) which have all the preferred characteristics, malformed pieces or bottles which may be whole in geometry but which have certain undesirable characteristics, and cullet 21 or fragmentary pieces or chips. Cullet 21 on the lehr belt 11 may be caused by breakage of the bottles 20 due to thermal shock, or from improper molding or annealing The cullet may range in size anywhere from slivers to one-half of a bottle or larger. In any event, and because the lehr belt 11 is formed of a link-chain kind of construction 22, see Figures 1 and 7, there is a certain size and shape of cullet which tends to become oriented such that it is embedded in or wedged in the lehr belt.

Figure 2:
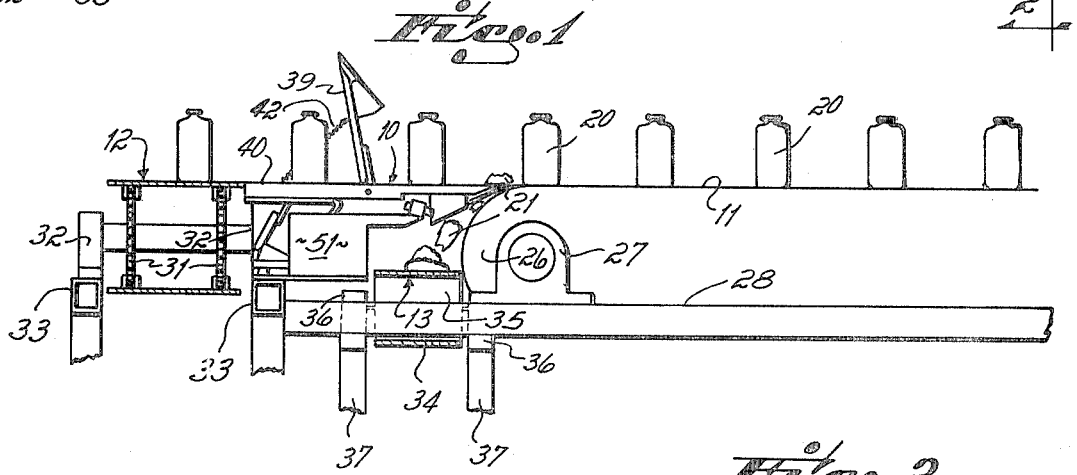
FIG. 2 is a cross-sectional view taken along lines 2—2 of FIG. 1.

The lehr belt 11 is a powered, chain link, belt-type conveyor that is carried on a drum or end roll 26 at its downstream end, the drum being mounted by bearing blocks 27 which are fixed to suitable support members 28. The takeoff conveyor 12 is a powered linked plate 29 type conveyor that is carried on a pair of sprockets 31 at its upstream end, the sprockets 31 being mounted in bearing blocks 32 which are fixed on suitable support members 33. The takeoff conveyor 12 may be an unscrambler-type conveyor accumulating table type conveyor or any other type conveyor desired such as are often used in handling of glassware. The axis of the takeoff conveyor 12 is positioned transverse to the axis of the lehr belt 11, the conveying plane of the takeoff conveyor is in substantially the same horizontal plane as the conveying plane of the lehr belt. The takeoff conveyor 12 is separated from the lehr belt 11 by assorting devices 10, see FIGS. 1 and 2.

The cullet conveyor 13 is a powered, flat belt 34 type conveyor and is carried on a drum 35 at its upstream end, the drum 31 being mounted in bearing blocks 36 that are fixed on suitable support members 37. The axis of the cullet conveyor 13 is positioned transverse to the axis of the lehr belt 11, and the conveying surface of the cullet conveyor is positioned closely adjacent to the downstream end of the lehr belt but is substantially below the conveying plane of the latter, see FIGS. 1 and 2.

Each assorting device 10 of each modular unit 9 of this invention, a series of which are positioned across the lehr belt's width, is in the form of a table 38 that comprises a trapdoor 39 and a transfer plate 40, the conveying plane of these two structural elements being in substantially the same horizontal plane as the conveying plane of the lehr belt 11 under normal operating conditions, see FIG. 4. The trapdoor 39 is pivotally mounted to the transfer plate 40 as at 41, and is provided with a tension spring 42 pinned at one end to the trapdoor and at the other end 37 to the transfer plate, see FIG. 3, so that the trapdoor will be held in the open position when desired, see FIG. 8.

Figure 8:
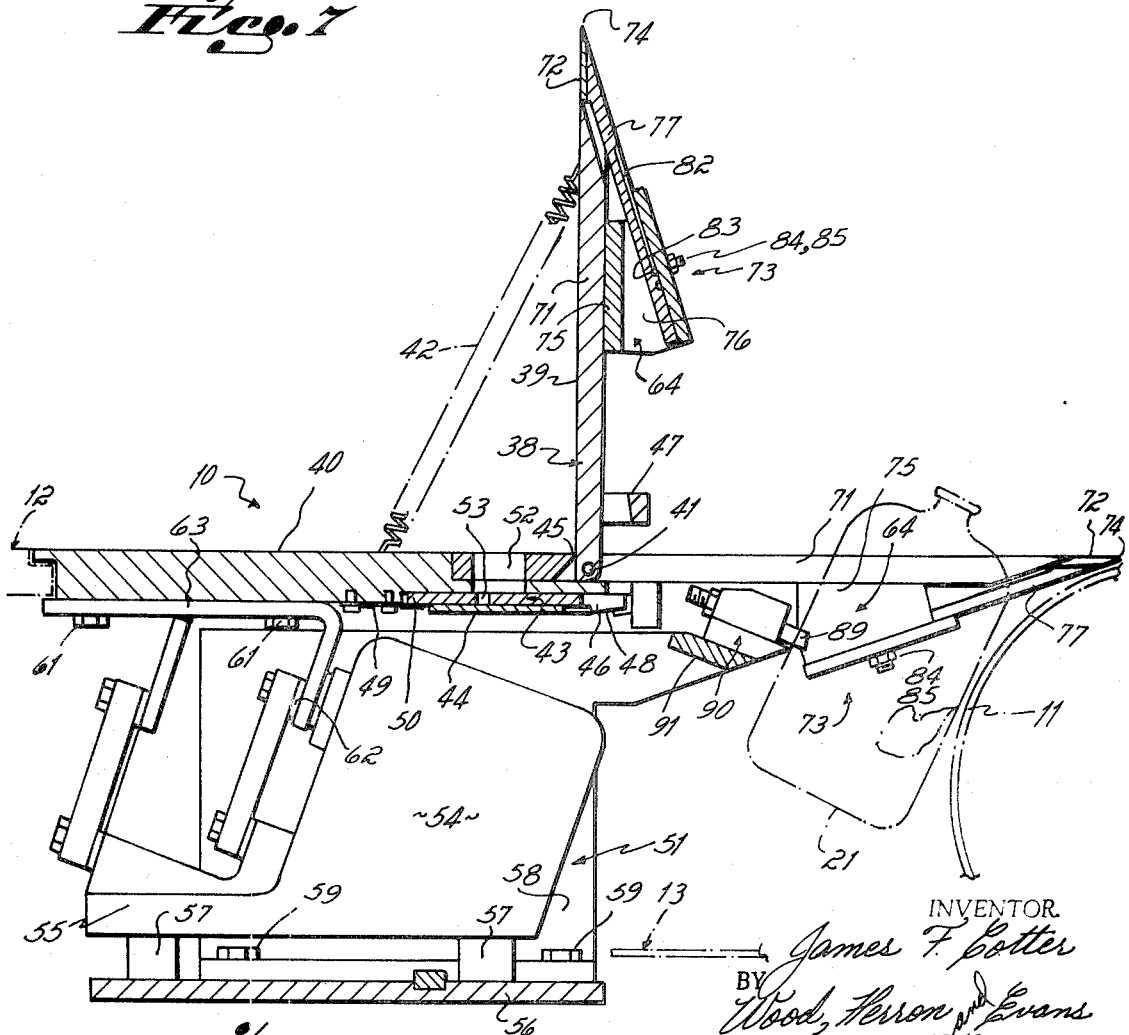
FIG. 8 is a cross-sectional view taken along lines 8—8 of FIG. 1.

The trapdoor 39 is held in common planar relation with the transfer plate 40, under normal operating conditions, by means of a bolt 43 that is slidably received in a sleeve or guide 44 fixed to the underside of the transfer plate at the leading edge 45 of the transfer plate, see FIGS. 3, 4, and 8. The bolt 43 is adapted to slide between a retracted position, see FIG. 8, at which the trapdoor 39 may be opened, and an extended position, see FIG. 4, whereat the two heads 46 of the bolt 43 cooperate with a catch block 47 fixed to the underside of the trapdoor, thereby maintaining the trapdoor 39 and transfer plate 40 is fixed desired horizontal relation. It will be noted that each head 46 of the bolt is provided with a cam surface 48 whereby it is locked or driven into frictional locking engagement with the catch block 47.

Fastener means in the form of a detent spring 49 is riveted to the underside of the transfer plate 40 in a position which permits it to cooperate with the rear 50 of the bolt 43 when the bolt is in the retracted position, see FIGS. 4 and 8. The detent spring 49, by bearing against the underside of the bolt 43 when it is in the retracted position, presses the bolt against the undersurface of the transfer plate 40 and thereby holds in fixed position relative to the transfer plate when the trapdoor 39 is in the open position. Such a detent spring 49 or fastener means is quite useful to keep the bolt 43 from "walking" out of the sleeve 44 and, thereby, becoming disengaged from its operating position, when the trapdoor 39 is open and vibrator means 51 is functioning (which vibratory means is described in detail below).

It will be noted that the transfer plate 40, toward its leading edge 45 thereof, is provided with an elongated hole 52 passing through the plate and exposing the bolt 43 therebeneath, see FIGS. 3, 4, and 8. Within the bolt's 43 body there is provided a hole 53 of a minor diameter relative to the length of the slot 52 in the transfer plate. By use of a hooked tool, not shown, an operator can insert the hook through the elongated aperture 52 in the transfer plate 40 to engage the hole 53 in the bolt's 43 body and, thereby, move the bolt 43 between the extended position and the retracted position as desired.

Each trapdoor 39 is segmented door in that it is made up of a faceplate 71 and a jaw plate 72, the jaw plate being positioned immediately downstream of the lehr belt 11 and in substantially the same horizontal plane as the faceplate under normal operating conditions, see FIG. 4, just above the end roll of the lehr belt. Thus, under normal operating conditions the pieces of ware move from the lehr belt 11 onto the jaw plate 72 and then onto the faceplate 71 and then onto the transfer plate 40 from whence they proceed onto the takeoff conveyor 12. The jaw plate 72 is mounted to the face plate 71 in a manner so that the entire trapdoor has vibratory motion imparted to its by the vibratory means 51. Thus, there is a conveying motion for each of the three components 40, 71 and 72 of the assorting device 10 which make up the conveying plane of the assorting device for moving the ware from the lehr belt 11 onto the takeoff conveyor 12, thereby providing a vibratory or live plate type of table 38 between the lehr belt and takeoff conveyor.

Figure 7:
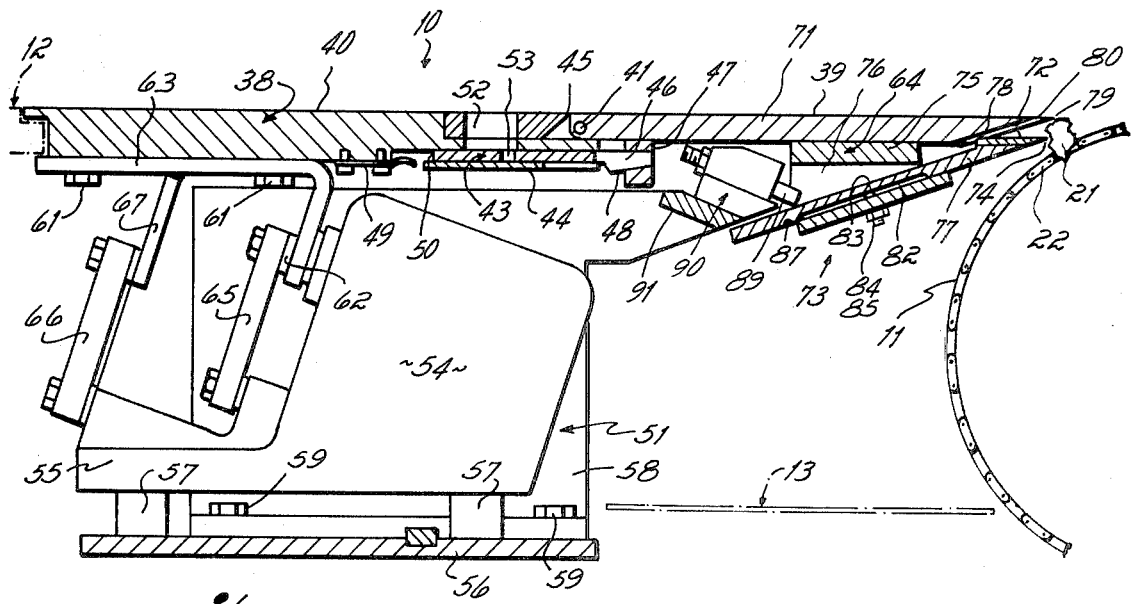
FIG. 7 is a cross-sectional view taken along lines 7—7 of FIG. 1.

The underside of each trapdoor's faceplate 71 has guide means 73 mounted to it, the guide means being associated with the jaw plate 72 for the purpose of guiding the jaw plate in a reciprocal path along which the jaw plate always remains parallel to the machine direction 14 of the lehr belt 11, see FIGS. 4, 5 and 7. The jaw plate 72, by virtue of the guide means 73 structure, is adapted to move or retract downward at an acute angle from the lehr belt 11 as required to permit debris or fragmentary pieces 21 catching between the leading edge 74 of the jaw plate and the lehr belt to pass beneath the jaw plate and fall onto the collection means, i.e., the cullet conveyor 13, see FIG. 7. The trailing edge 78 of the jaw plate 72 and the leading edge 79 of the faceplate 71 are both provided with fingers 80 which are interleaved much in the nature of escalator steps so as to help prevent glass chips from becoming lodged between the jaw plate and the faceplate.

The guide means 73 is in the form of the holder or cradle 64 mounted, as at 75, to the underside of faceplate 39, see FIGS. 3 and 4. The cradle 64 establishes a passageway 76 to receive a tongue 77 fixed to the jaw plate 72. The tongue 77, on its underside, is provided with a groove 82 within which, under normal operating conditions, is received a spring-biased cap 83. The spring-biased cap 83 is fixed to the cradle 64 by means of bolt 84 and nut 85. At the bottom end 86 of and outside of the groove 82 there is provided a notch 87 which is adapted to cooperate with the spring-biased cap 83 when the trapdoor 39 is in the open position, see FIG. 8. When the trapdoor 39 is open the jaw plate 72 need merely be pulled outwardly away from the faceplate 71 until the spring-biased cap 83 snaps into the recess 87 provided. Thereafter, the continued vibratory motion of the other assorting device 10 of a modular unit 9 will not cause the jaw plate 72 to move relative to the faceplate 71 while the trapdoor is open. The spring-biased cap 83, therefore, constitutes latch means associated with the jaw plate 72 and the faceplate 71 to maintain the jaw plate in fixed relation relative to the faceplate when the trapdoor 39 is open (see FIG. 8).

As will be noted from FIG. 5, the jaw plate's tongue 77, on its upper surface, is provided with serrations or ratchet teeth 88 which cooperate with a pawl 89 received in pawl holder 90. The pawl holder 90 is fixed on a strap 91 that extends between and is mounted to a pair of sidewalls 58. In each modular unit 9 the strap 91 mounts two pawl holders 90, one for each of the two assorting devices 10 in the modular unit, see FIGS. 3 and 4. Because the pawl holder 90 is fixed to sidewalls 58 and because sidewalls 58 are fixed to vibratory means 51, the holder 90 and, hence, the pawl 89, is caused to vibrate at substantially the same vibration amplitude and direction as the table 38.

The pawl holder 90 is comprised of a sleeve 92 that is oversized relative to the dimension of the pawl 89. The sleeve 92 is provided with yieldable means such as foam rubber or polyurethane pad 93 which permits the pawl 89 to rock about its longitudinal axis, see FIG. 5. At the rear end of the pawl's sleeve 92 there is provided a spring 89 loaded finger 94 that bears axially against the rear end of the pawl 89 and continuously urges the pawl against the ratchet teeth 88 on the jaw plate's tongue 77. The spring 98 loaded finger 94 is received in a separate sleeve 95 threaded to end block 96 of the pawl's sleeve 92 and held in plate by nut 97. The finger 94 is provided with a capped end 99 interiorly of the sleeve 95 to keep it from being pushed out of the sleeve. Thus, there is provided resilient means in the form of the spring 98 loaded finger 94 and spring means in the form of the foam rubber or polyurethane pad 93, both of which are associated with the jaw plate 72, which function to permit movement of the jaw plate in the machine direction of the lehr belt 11 as required to permit debris or cullet 21 catching between the leading edge 74 of the jaw plate 72 and the lehr belt to pass beneath the jaw plate. Further, there is provided positioning means in the form of the pawl 89 and ratchet teeth and 88 on the jaw plate's tongue 77 (the tongue being carried in sliding relation relative to the cradle 64 and the pawl being carried on structure that mounts the vibratory means 51, the pawl being adapted to engage the ratchet). Together the ratchet and pawl cooperate to maintain the jaw plate 72 in its position adjacent the lehr belt 11 under normal operating conditions, and also function, after debris or cullet 21 catching between the jaw plate'leading edge 74 and the lehr belt 11 has passed beneath the jaw plate, to reposition the jaw plate gradually. I have found that snap action repositioning is generally poorer than a gradual repositioning, since the snap may cause bottles to fall over.

At this point it is important to note that the preferred construction of the assorting device 10 of this invention is the modular unit 9 form with the single vibratory means 51 being provided for two assorting devices 10 positioned in side-by-side relation, see FIGS. 3, 4, and 6. A series of modular units 9, each unit comprising two assorting devices 10 with a single vibratory means 51, is positioned across the entire width of the lehr belt 11 so as to transfer the rows and columns of bottles coming from the lehr belt onto the takeoff conveyor 12, see FIG. 1. Preferably, an assorting device 10 is disposed at the downstream end of the lehr belt 11, for each column 18 of bottles 20 to be transferred. From a theoretical standpoint, a single vibratory source could be provided for all assorting devices 10 across the entire width of the lehr belt 11. Further, a single transfer plate 40 could be provided with a plurality of vibratory sources across the width of the lehr belt 11 with a trapdoor 39 being provided for each of the columns of ware carried by the lehr belt. However, it is very difficult from a practical standpoint to provide a single vibratory source 51 of sufficient power to achieve the desired motion effect on a series of assorting devices 10 so as to service adequately the entire width of the lehr belt 11. Further, with a series of vibratory sources positioned underneath a single transfer plate 40 that extends the width of the lehr belt, there arises a major problem of adjusting the vibratory sources 51, each of which has its own individual characteristics even though supposedly all are identical, to provide a unitary vibratory motion which is in complete phase across the entire width of the transfer plate. Thus, it has been found from experience that modular units 9 comprised to two assorting devices 10 with a single vibratory source 51 is a very practical and useful way to provide the entire width of the lehr belt 11 with a vibrating live plate transfer and assorting system.

Each vibratory means 51 serving a modular unit 9 is directly connected to the transfer plate 40 for each device 10, see FIGS. 4 and 6. The vibratory motion imparted to the transfer plate 40 is, of course, also imparted to the trapdoor 39 because the trapdoor is mounted to the transfer plate. Thus, the vibratory means 51 imparts a vibratory motion to the entire table 38 and, hence, to the entire assorting device 10. Preferably, the vibratory means 51 imparts vibratory motion to the table 38 only in the machine direction 14 of the lehr belt 11. The vibratory means 51 has the effect of transmitting the unitary vibratory motion to the table 38 so as to establish a vibrating live plate or table that provides automatic steady flow of the rows and columns of glassware, i.e., of pieces, from the lehr belt 11 to the takeoff conveyor 12.

The vibratory means 51 is comprised of an electromagnetic vibratory motor 54 which may, for example, be designed to operate on rectified 60 cycle AC to produce 3,600 vibrations a minute Each vibratory motor 54 includes a base mass or counter weight 55 for reaction absorption purposes. The base 55 of the vibratory motor is mounted to support table 56 further mounts upstanding sidewalls 58 by bolts 59. Each vibratory motor 54 is supplied with a separate controller, not shown, which contains a switch, rectifier, and rheostat. The power or amplitude of vibration can be regulated from high to low merely by turning the rheostat knob. Such electromagnetic vibratory motors 54, with accompanying controllers, are well known in the art.

The output shaft 62 of each vibratory motor 54 is directly connected to the underside of each of the two transfer plates 40 is a modular unit 9 by means of brackets 63 that are L-shaped in cross section. Each bracket 63 is fixed at one end by bolts 61 to the underside of the transfer plate 40 and is carried on the output shaft 62 of the motor 54 at the other end. A first set of fiberglass springs 65 is connected between the output shaft 62 of the vibratory motor 54 and the base or motor casting 55. Further, a second set 66 of fiberglass springs is fixed to the motor casting 55 at one end and is interconnected with the transfer plate 40 through bracket 67 which is welded to the L-shaped bracket on the underside thereof. One pair 65,66 of springs is provided for each transfer plate 40 in the modular unit 9. The fiberglass springs 65,66 affect the amplitude of the vibratory motion imparted to the table 38, and by varying the number of leafs in each of the fiberglass springs 65,66 the overall vibration amplitude may be varied.

In operation, and assuming that it is desired by an operator to assort an entire column 18 of pieces of ware from the series of columns proceeding down the lehr belt 11, the trapdoor 39 is unlocked by moving bolt 43 to its retracted position where it is restrained by spring 49, and then the door 39 is merely pivoted between that position illustrated in FIG. 4 and that position illustrated in FIG. 8. The trapdoor 39 is held in the open position by spring 42. In that posture of the trapdoor 39, namely, the open position, all pieces traveling in the column 18 served by that assorting device 10 are directed onto the cullet conveyor 13. That is, all pieces 17, whether bottles 20 of acceptable characteristics, fully formed bottles but with undesirable characteristics, or fragmentary pieces 21, are assorted from the other columns of ware on the lehr belt 11 and automatically directed onto the cullet conveyor 13 which, preferably, returns the assorted pieces back to a cullet pile for further use. When subsequently closed, i.e., under normal operating conditions, the trapdoor 39 is held closed by means of the two heads 46 of bolt 43 engaging the catch blocks 47 mounted to the underside of the faceplate 71, see FIG. 4.

Under normal operating conditions, i.e., under those conditions where it is not desired to assort an entire column 18 from the columns proceeding down the lehr belt 11 and under those conditions by which ware 17 is transferred from the lehr belt 11 to the takeoff conveyor 12, the trapdoor 39 is positioned as illustrated in FIG. 4. In this posture, ware 17 and large fragmentary pieces 21 coming from the lehr belt 11 first pass over the jaw plate 72, then over the faceplate 71, then over the transfer plate 40, and then onto the takeoff conveyor 12, the forward motion component across the table 38 being provided by the vibratory motor 54 which, as explained, transforms the table into a vibrating live plate. On those occasions when smaller fragmentary pieces 21 are embedded in the lehr belt 11 in any given column 18 of ware 17, the jaw plate 72 of the assorting device 10 that services that column is ready to automatically assort those pieces to prevent undue damage to the leading edge 74 of the jaw plate. Such damage, as mentioned, would adversely affect subsequent ware passing thereover by causing it to tip over, deflect it into adjacent columns, etc. Such a chip or fragmentary piece 21 that is embedded in or wedged in the lehr belt 11, upon engaging the leading or feather edge 74 of the jaw plate 72, forces the jaw plate to retract angularly downward beneath the trapdoor's faceplate 71, see FIG. 7. The jaw plate 72 may be guided in its angularly retractive movement partly by means of the interlaced fingers 80 of the jaw plate and of the faceplate 71 as well as by means of the sides 102 of the holder or cradle 64 which cooperate with the sides of the jaw plate's tongue 77, and because the pawl 89 is permitted to retract axially toward the end block 96 of its sleeve 92 compressing spring 98 as well as to cock laterally through spring pad 93. Such rearward or retractive action of the pawl 89 permits the jaw plate to retract or move rearwards relative to the lehr belt 11 because the pawl is pushed upward into its sleeve and, thereby, permits point 103 of the pawl to ride over the ratchet teeth 88 of the jaw plate's tongue 77. As soon as the fragmentary piece 21 has passed beyond the leading edge 74 of the jaw plate 72 it will generally drop out of the lehr belt 11 onto the cullet conveyor 13 and , thereby, be recycled.

After the fragmentary piece 21 has passed out of engagement with the leading edge 74 of the jaw plate 72, the jaw plate is gradually repositioned into its normal operating position (as illustrated in FIG. 4) with the transfer plate from that position illustrated in FIG. 7 because the pawl's tip 103 is constantly abutting the ratchet teeth 88 on the top surface of the jaw plate's tongue 77 to drive the jaw plate 72 angularly upward again. The pawl's driving source is provided by the vibratory motor 54 which causes the pawl 89 to reciprocate a very limited amount in the machine direction of the conveyor 11 and, of course, on the forward part of its reciprocatory cycle it engages the ratchet teeth 88 on the tongue 77 to push the jaw plate 72 back up into substantially the same horizontal plane as the transfer plate 71. As illustrated in FIGS. 4 and 5, the length of the jaw plate's tongue 77 is configured to cooperate with the pawl 89 so that when the pawl reaches the end of the tongue the jaw plate 72 is in its normal operating attitude, i.e., planar, with the top surface of the transfer plate 71.

Although the assorting device of this invention is described herein primarily with reference to the glassware industry, it will be readily appreciated by those skilled in the art that the features and concepts of the device, as defined in the accompanying claims, may also find application in other field of use where similar problems of sorting or transfer arise.

Having described the preferred embodiment of my invention, what I desire to claim and protect by Letters Patent is:

1. An assorting device also adapted to transfer pieces from a first conveyor toward second means under normal operating conditions, said device comprising a jaw plate positioned downstream of said first conveyor in substantially the same plane as the conveying plane of said first conveyor under normal operating conditions, said jaw plate normally positioned to receive pieces moving from said first conveyor and toward said second means, a table comprised of a transfer plate and a faceplate, said faceplate being pivotally connected to said transfer plate and said jaw plate being connected to said faceplate, said pieces moving from said first conveyor onto said jaw plate, then onto said table, and then onto said second means during operation of said assorting device under normal operating conditions, said jaw plate and said faceplate cooperating to form a trapdoor that may be pivoted between an open position whereat pieces and debris are permitted to drop beneath said table from the downstream end of said first conveyor and an operating position whereat said transfer plate, faceplate and jaw plate are in substantially the same horizontal plane as the conveying plane of said first conveyor under normal operating conditions, resilient means associated with said jaw plate to allow movement of said jaw plate away from said first conveyor as required when in normal operating position to permit debris catching between the leading edge of said jaw plate and said first conveyor to pass between said jaw plate and conveyor, and positioning means connected with said jaw plate for maintaining said jaw plate in operating position adjacent said first conveyor under normal operating conditions and for repositioning said plate in such position after debris catching between said jaw plate's leading edge and said first conveyor has passed.

2. An assorting device as set forth in claim 1 including guide means associated with said jaw plate, said guide means guiding said jaw plate in retraction at an acute angle downward beneath said table and away from said first conveyor as required to permit debris catching between the leading edge of said jaw plate and said first conveyor to pass beneath said jaw plate.

3. An assorting device as set forth in claim 2 including vibratory means connected at least to said table for imparting vibratory motion to said table in the machine direction of said first conveyor, said vibratory motion serving to operate said positioning means and serving to transfer pieces from guide means associated with said jaw plate, said guide means guiding said jaw plate in retraction at an acute angle downward beneath said table and away from said first conveyor as required to permit debris catching between the leading edge of said jaw plate and said first conveyor to pass beneath said jaw plate.

22. An assorting device as set forth in claim 21, wherein said guide means is comprised of a holder carried by said table on the underside thereof, and wherein said positioning means is comprised of a ratchet fixed to said jaw plate, said ratchet being carried in sliding relation in said holder, and a pawl carried on said vibratory means that is adapted to engage said ratchet under influence of said vibratory means.

23. An assorting device as set forth in claim 22, wherein said resilient means includes a spring-loaded finger bearing against said pawl and urging said pawl against said ratchet, and spring means bearing on said pawl that permits cocking of said pawl relative to this axis.

24. An assorting device also adapted to transfer pieces from a first conveyor toward a second conveyor under normal operating conditions, said device comprising a table having a faceplate and a transfer plate positioned downstream of said first conveyor, said plates being in substantially the same horizontal plane as the conveying plane of said first conveyor under normal operating conditions so that said pieces move from said first conveyor toward said faceplate, then onto said transfer plate, and then on toward said second conveyor during operation of said assorting device under normal operating conditions, and pivot means interconnecting said faceplate and said transfer plate by which said faceplate may be pivoted in trapdoor fashion between an open position so as to provide a substantial gap between said first conveyor and said transfer plate whereat good pieces, malformed pieces and debris are permitted to drop beneath said table from the downstream end of said first conveyor, and an operating position whereat said transfer plate and faceplate are in substantially the same horizontal plane as the conveying plane of said first conveyor.

25. An assorting device as set forth in claim 24 including lock means associated with said faceplate and said transfer plate to maintain said two plates in substantially the same horizontal plane under normal operating conditions.

26. An assorting device as set forth in claim 25 wherein said lock means includes a bolt adapted to slide between a retracted position at which position said trapdoor may be opened and an extended position at which said two plates are maintained in fixed horizontal relation and fastener means adapted to engage said bolt when in the retracted position to prevent movement of said bolt.

* * * * *

UNITED STATES PATENT OFFICE
CERTIFICATE OF CORRECTION

Patent No. 3,628,658                Dated December 21, 1971

Inventor(s) James F. Cotter

It is certified that error appears in the above-identified patent and that said Letters Patent are hereby corrected as shown below:

Column 6, Line 63, after "56" insert ---through legs 57. Support table 56---.

Column 9, Line 3, delete ---An assorting device as set forth in claim---.

Column 9, Line 43, after "claim" delete ---1--- and insert in its place ---3---.

Column 9, Line 70, after "said" delete ---faceplate, and then on toward said---.

Signed and sealed this 6th day of June 1972.

(SEAL)
Attest:

EDWARD M. FLETCHER, JR.          ROBERT GOTTSCHALK
Attesting Officer                Commissioner of Patents